United States Patent [19]
Ranade et al.

[11] Patent Number: 4,528,328
[45] Date of Patent: Jul. 9, 1985

[54] BLENDS OF VINYL HALIDE-POLYOLEFIN GRAFT POLYMERS AND ASA POLYMERS

[75] Inventors: Gautam R. Ranade, Grand Island; Gideon Salee, Williamsville, both of N.Y.

[73] Assignee: Occidental Chemical Corporation, Niagara Falls, N.Y.

[21] Appl. No.: 541,228

[22] Filed: Oct. 12, 1983

[51] Int. Cl.$^3$ .................. C08L 51/04; C08L 51/06
[52] U.S. Cl. ........................... 525/71; 525/75; 525/76; 525/85
[58] Field of Search .................. 525/71, 76, 85, 75, 525/290

[56] References Cited

U.S. PATENT DOCUMENTS

| | | | |
|---|---|---|---|
| 3,644,577 | 2/1972 | Lee et al. | 525/71 |
| 3,780,134 | 12/1973 | Lonning | 525/71 |
| 3,970,718 | 7/1976 | Takahashi et al. | 525/76 |
| 4,014,842 | 3/1977 | Kosugi et al. | 525/74 |
| 4,054,615 | 10/1977 | Hardt et al. | 525/290 |
| 4,071,582 | 1/1978 | Takahashi | 525/310 |
| 4,111,876 | 9/1978 | Bailey et al. | 524/521 |
| 4,173,596 | 11/1979 | DeWitt | 525/71 |
| 4,195,137 | 3/1980 | Walker | 525/290 |

FOREIGN PATENT DOCUMENTS 1158636  7/1969  United Kingdom .

*Primary Examiner*—Carman J. Seccuro
*Attorney, Agent, or Firm*—James F. Tao; James F. Mudd

[57] ABSTRACT

A novel thermoplastic polymer composition comprises a blend of a high impact vinyl halide polymer, particularly a vinyl halide-polyolefin graft polymer, and a copolymer of styrene and acrylonitrile modified with a base polymer such as an acrylic rubber or chlorinated polyethylene.

13 Claims, No Drawings

BLENDS OF VINYL HALIDE-POLYOLEFIN GRAFT POLYMERS AND ASA POLYMERS

BACKGROUND OF THE INVENTION

The present invention relates to thermoplastic polymer blends capable of being molded into plastic articles having improved properties. The polyblends of the present invention contain a graft copolymer of a vinyl halide, or of a vinyl halide and a comonomer copolymerizable therewith on a polyolefin component. Such copolymers are hereinafter referred to as "vinyl halide-polyolefin graft copolymers". The present blends also contain a polymer composition hereinafter referred to as "ASA polymers".

Polyvinyl halide, especially polyvinyl chloride polymers are widely used thermoplastic materials having many favorable properties. Such conventional nongraft vinyl halide polymers do not have heat distortion temperatures which are sufficiently high to adapt such polymers to much more wide use. Moreover, such polymers, especially rigid polyvinyl halide polymers, do not have a high impact resistance at ambient or subambient temperatures. Thus, at ambient temperature, i.e, at about 20° C., corresponding to about 68° F., the notched Izod impact resistance of vinyl halide homo- and copoymers is only of the order of about 0.4 to less than about 1 ft-lb/in. At subambient temperatures, e.g., down to −20° F. or lower, the notched Izod impact resistance of these polymers becomes vanishingly small or negligible.

It has been previously proposed to add minor amounts of an appropriate polymer additive, or additives, to improve ambient impact resistance of conventional polyvinyl polymer compositions. Usually, such additives are useful in ranges from about 3 to about 15 percent by weight of the polyvinyl halide polymer. Among the materials which have been found acceptable as polyvinyl halide impact modifiers are ABS polymers. Such impact modifiers moderately enhance the ambient temperature impact resistance of conventional vinyl halide polymers, i.e., generally raise the ambient temperature notched Izon impact resistance of the polymer to about 2 to 10 ft-lbs/in. However, these impact modifiers are relatively ineffective in imparting a satisfactory sub-ambient temperature impact resistance to the polymer, i.e., the −20° F. notched Izod impact resistance of the polymer containing the impact modifier is well below 1 ft-lb/in and usually is about 0.4 to 0.5 ft-lb/in.

Recently, vinyl halide-polyolefin graft copolymers have been developed to be a commercial reality. Such copolymers are produced by polymerization of vinyl halide (or a monomer mixture of vinyl halide and copolymerizable ethylenically unsaturated comonomer) in the presence of a polyolefin elastomer. Such reaction yields a polymer product which contains vinyl halide polymer chains bound, i.e., grafted at various sites along the chain of the trunk olefin polymer as well as ungrafted vinyl halide polymer and ungrafted polyolefin. The graft polymer product, especially the graft polymer product prepared by a liquid phase bulk polymerization reaction, has improved impact resistance at both ambient temperature and sub-ambient temperatures, compared to the aforementioned conventional, i.e., ungrafted, vinyl halide polymers, even when the latter are blended with a conventional polyvinyl halide impact modifying polymer additive.

The bulk polymerization-prepared graft polymer product is even distinguished from the corresponding graft polymer prepared by a non-bulk polymerization technique, e.g., suspension polymerization, by an enhanced impact resistance at both low and ambient temperature and by breakage by the desirable ductile breakage mode rather than by an undesirable brittle breakage mode.

Recently polymer products with improved properties have been prepared by blending the vinyl halide polyolefin graft polymers with ABS polymers. Such products are disclosed in copending application Ser. No. 250,957, filed Apr. 01, 1981.

It has now been found that further improved polymer products can be prepared by blending the vinyl halide polyolefin graft polymers, especially those produced by a liquid phase bulk polymerization reaction, and "ASA polymers" which are described hereinafter.

The miscibility exhibited by the matrix phases of these polymeric components of the invention offers several advantages. The miscibility provides excellent mechanical compatibility. Superior weld line strengths and improved surface properties can be obtained when a miscible polymer blend is used. A problem of possible deterioration of the properties due to phase separation during or after processing may exist for a immiscible blend. This is likely in case of the injection molding process which typically uses very high shear rates. This problem is unlikely in the case of a miscible polymer system. Also, an efficient heat distortion enhancement per unit weight of the added polymer can be usually obtained compared to the imiscible systems. Preferential segregation of additives associated with components of a polymer blend can occur. This problem is generally avoided with miscible blends.

SUMMARY OF THE INVENTION

The present invention relates to a moldable thermoplastic polymer composition which is comprised of a blend of a high impact vinyl halide polymer and an ASA polymer. The preferred high impact vinyl polymer is a vinyl halide hydrocarbon polyolefin graft polymer. By polyvinyl halide-polyolefin graft polymer is meant the product of the graft polymerization of vinyl halide in the presence of an olefin trunk polymer reactant as further described below.

By ASA polymer is meant a polymer of styrene and acrylonitrile that is modified by blending with or reaction with an acrylate polymer or a chlorinated polyethylene. Such ASA polymers are found to be highly miscible with the vinyl halide-polyolefin graft polymers.

The blends of this invention have beneficial properties when compared to prior art blends.

DETAILED DESCRIPTION OF THE INVENTION AND THE PREFERRED EMBODIMENTS THEREOF

While proportions of the ASA polymer in the present blend can range typically from less than about 1% to more than about 99 weight percent of ASA polymer (with the balance being the high impact vinyl polymer or graft polymer component), it is preferred to provide blends which contain from about 20% up to about 80% of ASA polymer to achieve the desired enhanced properties.

Preferred blends of the invention contain from about 60% to about 40% of the high impact vinyl polymer or graft polymer component and from about 40% to about 60% of the ASA polymer component, said percentages being based on the weight of the blend of the high impact vinyl polymer or graft polymer and the ASA polymer.

THE HIGH IMPACT VINYL HALIDE POLYMER

High impact vinyl halide polymers in high impact PVC are generally produced by blending PVC or other vinyl halide polymer with an impact modifier for a vinyl halide polymer.

Several different types of impact modifiers can be used to prepare high impact polyvinyl chloride formulations. These modifiers can be of the MBS (methacrylate-butadiene-styrene) type, ABS (acrylonitrile-butadiene-styrene) type, MABS (methacrylate-acrylonitrile-butadiene-styrene) type, chlorinated polyethylene type or copolymers of ethylene, such as ethylene vinyl acetate. The impact modifier can also be all acrylic type, such as, Durastrength 200 (M&T Chemical Company). Some of the examples of ABS, MBS or MABS impact modifiers are Blendex series of modifiers by Borg Warner Company (Blendex 301, Blendex 435, Blendex 301, Blendex 101, Blendex 121, etc.) Additional suitable impact modifiers used to prepare high impact PVC formulations can be Acryloid series of impact modifiers by Rohm and Haas Company, such as, Acryloid KM-653, Acryloid KM-641, Acryloid KM-323B, Acryloid KM-611 and Acryloid KM-330, etc.

The proportions of these modifiers in the polyvinyl chloride or other vinyl halide polymer can vary depending on the type and efficiency of the modifier, from 3 parts to 30 parts by weight per hundred parts of the resin. Preferably, the loading of modifier would be in the range from 5 parts to 15 parts by weight per hundred parts of the resin.

The impact modifiers for vinyl polymers are described in
(1) Encyclopedia of PVC, Edited by Leonard J. Nass, Vol. 2, Marcel Dekker, Inc. N.Y. and Basel.
(2) Technical Bulletin on Durastrength-200 Impact Modifier by M&T Chemical Company.
(3) Technical Bulletin on Acryloid KM-330 Modifier, Rohm and Haas Company
(4) Technical Bulletin on Blendex series of modifiers by Borg and Warner Company.

THE POLYVINYL HALIDE-POLYOLEFIN GRAFT COPOLYMER COMPONENT

The polyvinyl halide copolymer component is a graft copolymer of a vinyl halide (or of a vinyl halide and a comonomer copolymerizable therewith) and a polyolefin elastomer. The graft polyvinyl halide component may suitably be obtained by polymerizing a mixture of vinyl halide monomer with one or more ethylenically unsaturated comonomers (or more conveniently a vinyl halide monomer alone) in the presence of an olefin trunk polymer reactant.

The vinyl halide-graft copolymers of the polyolefin elastomers are prepared by polymerizing the vinyl halide in the presence of about 0.05 to about 20 percent, preferably about 1 to about 20 percent, based on the weight of vinyl halide monomer of the above-described polyolefin elastomer. Preparation of such vinyl halide-polyolefin graft copolymer according to emulsion and suspension polymerization techniques is described in G. Natta et al., U.S. Pat. No. 3,812,204, the disclosure of which is incorporated herein by reference. Preparation of such vinyl halide-polyolefin graft copolymer by vapor phase and solution polymerization techniques are described, respectively, in J. Dumoulin et al., U.S. Pat. No. 3,789,083 and F. M. Rugg et al., U.S. Pat. No. 2,947,719, the disclosures of which are incorporated herein by reference. Desirably, the preparation of the vinyl halidepolyolefin graft copolymers useful as the polyvinyl halide component of the composition of the invention is effected by a bulk liquid phase polymerization technique as described by A. Takahashi, U.S. Pat. Nos. 4,071,582, 4,163,033 and 4,169,870, and by L. E. Walker, U.S. Pat. Nos. 4,007,235; 4,067,928 and 4,195,137 the disclosure of which Takahashi and Walker patents is incorporated herein by reference.

Monomer Component

Suitable ethylenically unsaturated comonomer materials which can be used include: mono-olefinically unsaturated esters including vinyl esters, such as vinyl acetate, vinyl stearate, vinyl benzoate, and vinyl-p-chlorobenzoates; alkyl methacrylates, such as methyl, ethyl, propyl and stearyl methacrylates; alkyl crotonates, such as octyl crotonate; alkyl acrylates, such as methyl, ethyl, hexyl and stearyl acrylates; hydroxyether and tertiary butylamino acrylates, such as 2-ethoxy ethyl acrylate; isopropenyl esters, such as isopropenyl acetate; and other comonomers disclosed in the aforesaid patents of Takahashi.

Polyolefin Component

The polyolefin component can be a homopolymer, bipolymer, terpolymer, tetrapolymer or higher copolymer of olefinic monomers. The olefin polymers can also contain the residue of a polyene, e.g. a non-conjugated diene as a monomer unit. Preferably, the polyolefin is an elastomer.

Olefin homopolymers may be obtained by the polymerization of a suitable monomer, such as ethene, propene, i.e., propylene, butene-1, isobutene, octene or 5-methylhexene-1.

Suitable comonomers for use in preparing the polyolefins are those utilized to prepare the olefin homopolymers as listed above, e.g., propene or butene-1 with ethene and the like. Suitable termonomers are those utilized to prepare homopolymers and copolymers as disclosed above, such as propene, ethene and the like, as well as a polyene. Especially suitable polyene-derived ter- and higher copolymers can be prepared from olefin monomer mixtures containing up to 15 percent, preferably up to about 6 percent by weight, of the polyene (preferably non-conjugated), such as dicyclopentadiene, cyclo-octadiene and other dienes with linear or cyclic chains. The polyolefin used may also be a halogenated polyolefin, such as a chlorinated, brominated or fluorinated polyolefin.

Preferably, however, the polyolefin is a hydrocarbon polyolefin, that is, a polyolefin containing only carbon and hydrogen atoms.

The polyolefins used are characterized by being soluble, partially soluble or dispersible at ambient temperatures and pressure in the vinyl chloride graft copolymer component, and in having, typically, monomeric units of 2 to 8 carbon atoms. The weight average molecular weight of the olefin polymers, copolymers, terpolymers and tetrapolymers can vary from about 50,000 to about 1,000,000 and higher. Preferred as polyolefin elastomers for use in preparing vinyl halide graft polymers for use in the invention are ethene propene polyolefin elastomers and ethene-propene-diene polyolefin elastomers.

More particularly, the hydrocarbon olefin polymers which are suitably employed as trunk polymer reactant in the preparation of the present graft polymers is an elastomer having a weight average molecular weight of about 50,000 to 1,000,000, preferably of about 50,000 to 300,000 which is soluble, partially soluble or dispersible in the liquid phase polymerization reaction mixture. The trunk polyolefin reactant is suitably selected from the group consisting of:

(a) a homopolymer of an aliphatic hydrocarbon olefin monomer of 2 to 8 carbon atoms;

(b) a copolymer of 2 or more of said olefin monomers; and (c) a polymer of at least one of said olefin monomers and no more than 15 percent, based on the weight of the polymer, of a non-conjugated aliphatic hydrocarbon polyene of 4 to 18 carbon atoms wherein all of the carbon-to-carbon double bonds do not form a conjugated system.

THE ASA POLYMER COMPONENT

The ASA polymer is a polymer of styrene and acrylonitrile (often referred to in the trade as a SAN polymer) that is modified with an acrylate polymer or a chlorinated polyethylene. Generally the styrene and acrylonitrile components are reacted with the acrylate polymer or the chlorinated polyethylene.

One such suitable ASA polymer is disclosed in U.S. Pat. No. 4,111,876, the disclosure of which is incorporated herein by reference. In accordance with the patent, a preferred ASA polymer is prepared by an improved process which comprises: introducing at least one primary polymerizable feed composition, selected from the group of monomers consisting of styrene, acrylonitrile, acrylate ester, and a mixture of two or more of such monomers, from at least one primary feed source to a polymerization zone, the primary polymerizable feed composition continually varying in compositional content of the polymerizable reactants therein during the continuous introductions; simultaneously adding to the primary feed source at least one different second polymerizable feed composition, selected from the group of monomers consisting of styrene, acrylonitrile, acrylate ester and a mixture of two or more of such monomers, from at least one secondary feed source so as to continually change the compositional content of the polymerizable reactants of the primary polymerizable feed composition in the primary feed source; and continuously polymerizing the primary polymerizable feed composition introduced to the polymerization zone until desired polymerization has been achieved. The primary polymerizable feed composition being different from the secondary polymerizable feed composition. The polymerization is preferably conducted under monomer starved conditions. The weight ratio of acrylonitrile to styrene is preferably about 1 to 3 in a clear or transparent ASA polymeric material.

Any of the known acrylate esters can be used. While the preferred acrylate ester is 2-ethylhexyl acrylate, other lower alkyl acrylates having 2 to 12, preferably 4 to 10, carbon atoms in the alkyl group, such as, ethyl acrylate, isopropyl acrylate, propyl acrylate, n-butyl acrylate, hexyl acrylate, dodecyl acrylate, 3-methyl-1-butyl acrylate, isobutyl acrylate and isodecyl acrylate, can be used.

Styrene and acrylonitrile provide a hard matrix component and the acrylonitrile, styrene and acrylate ester provide the rubber or elastomeric segment. The prefered ratio of acrylonitrile to styrene is in the range of 1 to 3. The hard matrix acrylonitrile-styrene (AS) to elastomer weight ratio in the ASA should be in the range of between 40 to 60 and 60 to 40.

A commercially available embodiment of this ASA polymer was found to have a composition of 56 percent styrene, 15.2 percent acrylonitrile and 28.8 percent acrylate polymer, all percentages by weight.

Another suitable ASA polymer is disclosed in U.S. Pat. No. 4,151,226, the disclosure which is incorporated herein by reference. This ASA polymer is prepared by graft copolymerizing in the presence of a water-soluble polymer and a radical polymerization initiator in an aqueous medium, 90 to 60 part by weight of a monomer mixture comprising 30 to 100 percent by weight of an aromatic vinyl compound, such as styrene, and 0 to 70 percent by weight of an acrylonitrile component in which the proportion of acrylonitrile is 20 to 100 percent by weight with the remainder being methylmethacrylate. This monomer mixture is copolymerized in the presence of 10 to 40 parts by weight (in terms of solids content) of a rubbery copolymer latex obtained by copolymerizing in an aqueous emulsion a mixture comprising (1) 60 to 99.9 percent by weight of at least 1 alkyl acrylate such as butyl acrylate, having 1 to 13 carbon atoms in the alkyl group, (2) 0 to 20 percent by weight of at least one vinyl compound copolymerizable with (1), such as styrene, and (3) 0.1 to 20 percent by weight of at least one organic polyallyl compound copolymerizable with component (1), such as triallyl isocyanurate. In the polymerization process, the reaction system is subjected to a mechanical mixing treatment by means of, for example, an ordinary agitator, homogenizer or colloid mill and then conducting the graft copolymerization.

The preferred aromatic vinyl compound is styrene. However, various vinyl acromatic monomers can also be employed such as alkyl styrene such as p-methyl styrene, ethylstyrene, isopropyl styrene, p-tertiary butyl styrene, and the like; halogen substituted styrene such as chlorostyrene and dichlorostyrene, and the like.

Suitable alkyl acrylates are those which contain an alkyl group having 1 to 13, preferably 4 or less, carbon atoms. Specific acrylates include 2-ethylhexyl acrylate, ethyl acrylate, isopropyl acrylate, propyl acrylate, n-butyl acetate, hexyl acrylate, dodecyl acrylate, 3-methyl-1-butyl acrylate, isobutyl acrylate and isodecyl acrylate.

The organic polyallyl compounds used in preparing the rubber copolymer act as a crosslinking agent for the acrylic ester, and provide grafting active sites in the graft copolymerization, whereby favorable results are obtained. Such effects result from the fact that the allyl group is very easily reacted with a radical, which enables the effective crosslinking reaction in polymerization into the rubbery copolymer. Further, the remaining allyl groups provide effective grafting active sites in the graft copolymerization, since a radical chain transfer to the residual allyl groups easily takes place. The organic polyallyl compounds used include trially cyanurate, triallyl isocyanurate, diallyl phthalate, diallyl isophthalate, diallyl terephthalate, triallyl trimellitate, diallyl trimellitate, tetraallyl pyromelliate, triallyl pyromellitate, diallyl pyromellitate, diallyl maleate, diallyl fumarate, diallyl adipate, etc., whereas those organic polyallyl compounds which are unable to copolymerize with an acrylic ester, such as triallylamine, diallylamine, and dially sulfide are, of course, excluded from the scope of this invention. The amount of the organic polyallyl compound used should be such that 0.1 to 20 percent, preferably 0.5 to 10 percent, by weight of the compound based on the total weight of the monomer mixture. When the amount is less than 0.1 percent by weight, the polyallyl compound cannot show a sufficient crosslinking effect, and when the amount is more than 20 percent by weight, it adversely affects the rubber elasticity. The organic polyallyl compounds may be used alone or in combination of two or more.

In the polymerization into the rubbery copolymer (A), a part of the alkyl acrylate may be replaced by at least one vinyl compound copolymerizable with the acrylic ester, such as, for example, styrene, acrylonitrile, or methyl methacrylate. In such a case, the proportion of the vinyl compound is 30 percent by weight or less, preferably 20 percent by weight or less based on the total weight of the monomer mixture.

This ASA polymer is produced in accordance with processes and additives such as initiators, emulsifiers, and the like, disclosed in the aforesaid U.S. Pat. No. 4,151,226.

A commercial embodiment of this ASA polymer comprises 58.4 percent of styrenic monomer, 23.3 percent acrylonitrile and 18.3 percent acrylic polymer, all percentages being by weight.

Another suitable ASA polymer is disclosed in U.S. Pat. No. 3,953,540, the disclosure of which in incorporated herein by reference. Such products comprise acrylonitrile, styrene and chlorinated polyethylene. Included are the graft type resins which are obtained by copolymerizing a chlorinated polyethylene with a mixture of acrylonitrile and styrene, (b) the blend type resins which are obtained by mixing a chlorinated polyethylene with an acrylonitrile-styrene copolymer, and (c) the graft-blend resin which is obtained by mixing the foregoing graft type resin with an acrylonitrile-styrene copolymer. Also included are such resins in which methyl methacrylate is substituted for a part of the acrylonitrile, as well as those in which alpha-methylstyrene is substituted for a part of the styrene. Suitable chlorinated polyethylenes are those obtained by chlorinating a polyethylene of an average molecular weight of above 50,000 and preferably above 100,000, and in addition, those obtained by chlorinating ethylene copolymers such as ethylene-propylene or ethylene-butene-1, as well as polymers obtained by chlorosulfonating polyethylene.

In the foregoing polymers, the chlorinated polyethylene is present in an amount from about 25 to 35 percent by weight, and the degree of chlorination of the chlorinated polyethylene is about 30 to about 45 percent by weight. The ratio of acrylonitrile to styrene is preferably in the range of 1:99 to 50:50.

One commercially available ASA polymer of this type contains 40.8 percent styrene, 14.9 percent acrylonitrile and 44.3 percent chlorinated polyethylene, all percentages by weight. Another commercially available ASA polymer of this type contains 52.1 percent styrene, 13.1 percent acrylonitrile and 34.7 percent chlorinated polyethylene, all percentages by weight.

In preparing the ASA polymers, any of the vinyl aromatic compounds disclosed herein may be employed. Unsaturated nitriles that can be employed include acrylonitrile, as well as alkyl substituted acrylonitrile such as methacrylonitrile.

OPTIONAL ADDITIVES

The compositions of the invention can also contain various functional additives which additives are conventional in the preparation of vinyl halide polymer molding compositions. Typically, these additives include thermal and/or light stabilizers as well as external and internal lubricants and processing aids for the graft vinyl halide resin component and other polymers of the blends of the invention.

Stabilizers suitable for use in making the vinyl halide graft polymer compositions of the invention include materials known to stabilize polyvinyl halide against the degradation action of heat and/or light. They include known stabilizers, both organic and inorganic, such as metal salts of mineral acids, salts of organic carboxylic acids, e.g., carboxylic acids of 6 to 18 carbon atoms, organo-tin compounds, epoxides, amine compounds and organic phosphites. Conveniently, an organo-tin compound, such as a methyl tin mercaptide, is employed as a stabilizer.

A more detailed description of suitable stabilizers, lubricants and processing aids for incorporation into the compositions of the invention is presented in U.S. Pat. No. 4,319,002, the disclosure of which is incorporated herein by reference.

Additional classes of additives known for use in polyvinyl halide resins which can be added optionally to the compositions of the invention in addition to the aforementioned stabilizers, lubricants and processing aids include pigments, dyes and fillers as described in L. R. Brecker, Plastics Engineering. March 1976, "Additives 76", pages 3–4, the disclosure of which is incorporated herein by reference.

In general, the amount of each type of the aforementioned optional additive employed in the present composition is about 0.01 to about 5 weight percent, preferably about 0.1 to about 3 weight percent, based on the total resin composition.

The compositions of the invention are essentially of the rigid vinyl halide resin type which contain no more than about 10 weight percent of a plasticizer for vinyl halide grade polymer and preferably are free of said plasticizing additive. Typical suitable plasticizer additives (which are generally organic compounds) conventionally employed in polyvinyl halide compositions include, for example, the esters of aliphatic alcohols of medium chain length of about 7 to 11 carbon atoms, with phenyl dicarboxylic acids, such as di-n-octyl phthalate and di-iso-nonyl phthalate as well as organic phosphate esters, such as cresyl-diphenyl-phosphate and octyl diphenyl-phosphate. The chemical structure and technology of plasticizers conventionally employed in polyvinyl halide compositions is more particularly discussed in L. R. Brecker, op. cit. page 5, the disclosure of which is incorporated herein by reference.

PREPARATION OF BLENDS

The compositions of the invention can be prepared by conventional milling and molding techniques. Generally, the component polymers (and, if desired, the above-described optional additives) are added as a particulate solid mixture to a roll mill or a Banbury type mixer and milled at an elevated temperature conventional for processing rigid vinyl halide polymer compositions. The resultant polymer blend obtained as a product from the milling and mixing operation is molded by either an injection or compression molding technique or extruded to produce articles of particular desired shapes at elevated temperature and pressure conditions which are conventional in molding rigid polyvinyl halide compositions. Desirably, an injection molding technique is employed to prepare the aforementioned articles which can be in various shapes including bars, plates, rings, rods, as well as sheets and films. Physical or chemical blowing agents can also be added to the moulding compounds according to the invention in order to produce a foam structure under suitable operating conditions.

In addition to the above-mentioned additives, other polymeric materials can be blended with the blend compositions of this invention.

THE EXAMPLES

The following examples further illustrate the various aspects of the invention but are not intended to limit it. Various modifications can be made in the invention without departing from the spirit and scope thereof. Where not otherwise specified in this specification and claims, temperatures are given in degrees centigrade, and all parts and percentages are by weight.

In the following examples, blends were prepared of the following polymer components:

Vinyl Polymer—A

A graft polymer of vinyl chloride and an EPDM elastomer prepared in a two-stage mass polymerization process such as described in U.S. Pat. No. 4,071,582. The EPDM elastomer was a copolymer of ethylene, propylene and ethylidene norbornene and was present in the polymer in a proportion of about 14 weight percent. The ethylene to propylene ratio was approximately 60 to 40. The graft polymer had a number average molecular weight of 24,000, a weight average molecular weight of 89,900 and a ratio of weight to number average molecular weight of 3.74. The graft polymer was compounded in a Henschel mixer using two parts of Thermolite T-31 stabilizer, two parts of Acryloid K-120N processing aid manufactured by the Rohm and Haas Company, 1.5 parts of Aldo MS lubricant aid manufactured by The Glyco Chemical Company, and 0.25 part of calcium stearate lubricant, all parts by weight per 100 parts by weight of the graft polymer.

Vinyl Polymer—B

A graft polymer of vinyl chloride and an EPDM elastomer as in Vinyl Polymer A except that the proportion of EPDM elastomer was about 7 percent. The graft polymer was compounded in the same manner and using the same formulation as in the case of Vinyl Polymer A.

ASA Polymer—I

A polymer of styrene and acrylonitrile and a chlorinated polyethylene, sold commercially as ACS-960 by the Showa Denko Company. The polymer had a number average molecular weight of about 38,000, a weight average molecular weight of about 120,000 and a ratio of weight to number average molecular weight of 3.22. The proportion of components was about 40 percent styrene, about 15 percent acrylonitrile and about 45 percent chlorinated polyethylene, all percentages by weight based on the weight of graft polymer.

ASA Polymer—II

A polymer of styrene and acrylonitrile and acrylic rubber sold commercially as ASA-1,000 by Stauffer Chemical Company. This polymer has a number average molecular weight of about 45,000, a weight average molecular weight of about 130,000 and a ratio of weight to number average molecular weight of 2.87. The polymer contains about 56 percent styrene, about 15 percent acrylonitrile and about 29 percent acrylic rubber, all percentages by weight.

ASA Polymer—III

A polymer of styrene, acrylonitrile and acrylic rubber sold commercially as VITAX-8,000 by Hitachi Chemical Company. The number average molecular weight is about 42,000, the weight average molecular weight is about 165,000 and the ratio of weight to number average molecular weight is 3.91. The polymer contains about 58 percent styrene monomer, about 23 percent acrylonitrile and about 19 percent acrylic rubber, all percentages by weight.

ASA Polymer IV

A polymer of styrene and acrylonitrile and a chlorinated polyethylene, sold commercially as ACS-920 by the Showa Denko Company. The polymer had a number average molecular weight of about 42,000, a weight average molecular weight of about 117,000 and a ratio of weight to number average molecular weight of 2.76. The proportion of components was about 52 percent styrene, about 13 percent acrylonitrile and about 35 percent chlorinated polyethylene, all percentages by weight based on the weight of graft polymer.

All polymers used in these examples were dryed before preparing the blends. The blends were prepared on a two-roll Farrell mill heated using a hot oil system. A front roll temperature of 360° F. and a back roll temperature of 340° F. was used. The milling time was kept to a minimum necessary for obtaining good mixing, normally about 4 to 5 minutes. Due care was taken to obtain a good lateral mixing on the mill. The blend was removed from the mill in the form of a sheet and quickly cut into small pieces. These pieces were coarse ground after cooling. The injection molded tensile and flexural bars were used for evaluating mechanical properties. The injection molding of samples having appropriate ASTM configurations was carried out using an Arburg injection molding machine (Model 221E-150). Table 1 shows the details of the testing procedures used to obtain various properties.

TABLE 1

| | | Summary of Testing and Characterization Methods | | | |
|---|---|---|---|---|---|
| Property/Data | ASTM Method | Instrument Used | Number of Samples | Type of Sample | Comments |
| Tensile Properties Modulus Strength (Yield) Elongation (Yield) | D638 | Instron- Model TTC | 5 | Injection Molded Std dog bone shape Tensile bar. (⅛" × ½"6½") | Strain rate of 0.2"/minute |
| Izod Impact Room Temperature (23.3° C.) or | D256 | Izod Impact Tester | 3 | Injection Molded Flex Bars (½" × ½" × 5") | Three bars tested at both sprue and vent ends. All samples were notched using standard size. |

TABLE 1-continued

| Property/Data | ASTM Method | Instrument Used | Number of Samples | Type of Sample | Comments |
|---|---|---|---|---|---|
| Low Temperature (−28° C.) Specific Gravity | D792 | Standard Balance | 2 | Injection Molded Bar | Calculated from weight loss of the sample after immersing in distilled water. |
| Heat Distortion Temperature | D648 | Standard Heat Deflection Bath | 2 | Injection Molded Flex Bar (½" × ⅛"/5") | Tested at 264 psi. Sample immersed in silicone. Bath heated at 2° C./min. Sample bar tested edgewise. Two different conditioning methods used for each composition: (a) 48 hours at 50° C. (b) 24 hours at 70° C. |
| Flexural Properties Modulus Strength (Yield) Strain (Yield) | D790 | Instron Model-TMS | 5 | Injection Molded Flexural Bar (½" × ⅛" × 5") | Cross head speed of 0.5" per minute |

EXAMPLE 1

Vinyl Polymer A and ASA Polymer I were blended in a weight ratio of 40 to 60, respectively, in accordance with the foregoing procedure. Physical properties were run according to the foregoing procedure and the results are shown in Table 2.

TABLE 2

| PROCESSING (injection Molding Parameters on Arburg Injection Molding Machine) | |
|---|---|
| Injection Pressure | 14,800 psi |
| Barrel Temperature - Front | 350° F. |
| Barrel Temperature - Rear | 320° F. |
| Mold Temperature | 100° F. |
| Nozzle Setting | 65% |
| Linear Mold Shrinkage | 0.003 in/in. |
| Specific Gravity | 1.26 |

TABLE 2-continued

| Water Absorption (24 Hrs @ 23° C.) | 0.16% |
|---|---|
| BRABENDER TORQUE RHEOMETER DATA | |
| Fusion Time | 11 sec. |
| Maximum Fusion Torque | 4000 meter-gram |
| Equilibrium Torque | 1150 meter-gram |
| Decomposition Time | 21 minutes |

EXAMPLES 2-7

Blends of Vinyl Polymer A and ASA Polymer I were prepared according to the foregoing method in the ratios shown in Table 3. The properties of the blends and components were tested as in the foregoing procedures and are shown in Table 3.

TABLE 3

MECHANICAL PROPERTIES OF VINYL POLYMER A AND ASA POLYMER I BLENDS

| Expl. No. | Composition Vinyl Polymer A: ASA Polymer I | Notched Izod Impact (−23.3° C.) ft-lb/in | Notched Izod Impact (−28.8° C.) ft-lb/in | Tensile Modulus $\times 10^{-5}$ psi | Tensile Strength $\times 10^{-3}$ psi | Tensile Elongation at Yield % | UL-94 Rating ⅛" | 1/16" | HDT - 264 psi * | ** |
|---|---|---|---|---|---|---|---|---|---|---|
| 2 | 100:0 | 20.9 | 2.36 | 2.92 | 4.78 | 3.16 | V-0 | V-0 | 68 | 68 |
| 3 | 80:20 | 19.9 | 1.47 | 2.96 | 4.92 | 3.34 | V-0 | V-0 | 75 | 70 |
| 4 | 60:40 | 18.0 | 1.01 | 2.89 | 5.12 | 3.48 | V-0 | V-0 | 79 | 72 |
| 5 | 40:60 | 11.0 | 0.76 | 3.09 | 5.36 | 3.21 | V-0 | V-0 | 83 | 74 |
| 6 | 20:80 | 9.0 | 0.53 | 3.14 | 5.62 | 3.06 | V-0 | V-0 | 86 | 76 |
| 7 | 0:100 | 2.8 | 0.43 | 3.53 | 5.87 | 2.39 | V-0 | V-0 | 88 | 80 |

*Annealed for 24 hours at 70° C.
**Annealed for 48 hours at 50° C.

| MECHANICAL PROPERTIES | |
|---|---|
| Tensile Strength | 5.6 × 10³ psi. |
| Tensile Modulus | 3.2 × 10⁵ psi. |
| Elongation | 3.2% |
| Notched Izod Impact @ 23.3° C. (all samples non-break) | 12.1 ft-lb/in. |
| Notched Izod Impact @ −28.8° C. | 1.1 ft-lb/in. |
| Flexural Strength | 9.8 × 10³ psi. |
| Flexural Modulus | 3.3 × 10⁵ psi. |
| % Strain | 4.5 |
| Rockwell Hardness | R-88 |
| Shore Durometer Hardness | 77 |
| Gardner Impact | 368 in-lb. |
| THERMAL PROPERTIES | |
| Linear thermal expansion coeff. × 10⁺⁵ | 4.1-4.6 in/in °F. |
| Heat distortion temperature (264 psi) | 76° C. |
| Heat distortion temperature (annealed) (at 264 psi) | 84° C. |
| UL-94 Rating ⅛" (0.125") | V-0 |
| UL-94 Rating 1/16" (0.0625) | V-0 |
| Oxygen Index = 32.6 | |
| OTHER | |
| Gloss | 91.2 |

EXAMPLES 8-11

Vinyl Polymer A was blended with ASA Polymer I in the proportions shown in Table 4. 55 gram samples of each blend were dried and tested by Brabender Torque Rheometer. The results are shown in Table 4.

TABLE 4

| Example No. | 8 | 9 | 10 | 11 |
|---|---|---|---|---|
| Vinyl Polymer A: ASA Polymer I | 80:20 | 60:40 | 40:60 | 20:80 |
| Ram Pressure (grams) | 7500 | 7500 | 7500 | 7500 |
| R.P.M. | 63 | 63 | 63 | 63 |
| Max Fusion Peak (seconds) | 19.8 | 13.8 | 11.4 | 10.2 |
| Max Fusion Torque, (meter grams) | 4200 | 4050 | 4000 | 4400 |
| Equilibrium Torque, (meter grams) | 1000 | 1000 | 1150 | 1050 |
| Decomposition (minutes) | 23.2 | 20.8 | 20.8 | 26.8 |
| Stock held at Temperature (°F.) | 400 | 400 | 400 | 400 |

The foregoing examples show that blends of a vinyl halide polyolefin polymer with a polymer of styrene, acrylonitrile and chlorinated polyethylene have a good balance of impact strength and heat distortion temperature. It has also been found that these blends exhibit good thermal aging properties, good processability and have excellent miscibility. These blends are superior to blends of the vinyl halide polyolefin polymer and ABS polymer with respect to weather resistance and fire retardance. The blends of the invention have excellent flame retardance in all proportions, wherein fire retardance drops in the case of blends with higher proportions of ABS.

EXAMPLES 12-18

Blends of various proportions of Vinyl Polymer A and ASA Polymer III were prepared as indicated in Tables 6 and 7, using the above described blending procedures. The blends and individual components were tested according to the procedures listed in Table 1 and the results are shown in Tables 6 and 7.

The foregoing Examples 12-18 show that blends of a vinyl halide polyolefin polymer and a polymer of styrene, acrylonitrile and an acrylic rubber have a good balance of properties such as impact strength, heat distortion temperature and other mechanical properties. It has also been found that these blends have excellent miscibility. The vinyl polymer serves to improve the processibility of ASA Polymer III. These blends are superior with respect to enhancement of heat distortion temperature than blends of the vinyl halide polyolefin with ABS polymers.

EXAMPLES 19-24

Blends of various proportions of Vinyl Polymer A and ASA Polymer II were prepared as indicated in Table 8 using the above described blending procedures. The blends and individual components were tested using the procedures listed in Table 1, and the results are shown in Table 8.

The foregoing Examples 19-24 show that the blends of a vinyl halide polyolefin polymer and a polymer of styrene, acrylonitrile and an acrylic rubber have a good balance of impact strength and heat distortion temperature. These blends have also been found to have good miscibility. They also have excellent retention of impact strength on accelerated weathering compared to blends of the vinyl halide polyolefin polymer and ABS polymers. They also exhibit much higher impact strength at room temperature compared to the corresponding ABS blends.

TABLE 6

Mechanical Properties of Vinyl Polymer A and ASA Polymer III Blends

| Ex. No. | Weight Ratio of Vinyl Polymer A to ASA Polymer III | UL-94 Fire Retardance 1/8" 1/16" | HDT (264 psi) 24 Hrs. at 70° C. (48 Hrs. at 50° C.) | 23.3° C. Impact ft-lb/in | −28.8° C. Impact ft-lb/in | Flexural Modulus $\times 10^{-5}$ psi | Flexural Strength $\times 10^{-3}$ psi | % Stain (Yield) | Tensile Modulus $\times 10^{-5}$ psi | Tensile Strength $\times 10^{-5}$ psi | Tensile Elongation (Yield) % |
|---|---|---|---|---|---|---|---|---|---|---|---|
| 12 | 100:0 | | | | | | | | | | |
| 13 | 80:20 | V-0 V-0 | 80 (73) | 19.7 | 1.2 | 3.09 | 9.39 | 4.69 | 3.12 | 5.31 | 3.23 |
| 14 | 60:40 | V-1 NC | 85 (76) | 17.3 | 0.9 | 3.27 | 10.21 | 4.87 | 3.13 | 5.55 | 3.41 |
| 15 | 50:50 | V-1 NC | 88 (79) | 11.8 | 1.3 | 3.48 | 10.89 | 4.84 | 3.54 | 6.04 | 3.34 |
| 16 | 40:60 | NC NC | 89 (80) | 5.9 | 0.7 | 3.72 | 11.81 | 4.83 | 3.5 | 6.45 | 3.6 |
| 17 | 20:80 | NC NC | 94 (85) | 2.4 | 0.48 | 3.92 | 12.45 | 4.85 | 3.61 | 6.73 | 3.43 |
| 18 | 0:100 | NC NC | 99 (92) | 1.1 | 0.49 | 4.11 | 13.36 | 5.1 | 3.84 | 7.16 | 3.35 |

TABLE 7

Properties of Vinyl Polymer A and ASA Polymer III Blends

| Ex. No. | Weight Ratio of Vinyl Polymer A to ASA Polymer A to | Linear Coefficient of Expansion Parallel Direction in/in | Linear Coefficient of Expansion Perpendicular Direction °F. $\times 10^{-5}$ | Linear Mold Shrinkage in/in | Rockwell Hardness | Water Absorption % Wt Change | Shore Durometer Hardness |
|---|---|---|---|---|---|---|---|
| 13 | 80:20 | 4.17 | 4.88 | 0.004 | R-89 | 0.16 | 76.2 |
| 14 | 60:40 | 3.82 | 4.7 | 0.004 | R-91 | 0.182 | 77.5 |
| 15 | 50:50 | 3.75 | 4.96 | 0.004 | R-93 | 0.194 | 77.4 |
| 16 | 40:60 | 3.7 | 4.72 | 0.004 | R-95 | 0.234 | 78.6 |

TABLE 8

Mechanical Properties of Blends of Vinyl Polymer A and ASA Polymer II

| Ex. No. | Weight Ratio of Vinyl Polymer A to ASA Polymer II | Notched Izod Impact ft-lb/in 23.3° C. | Notched Izod Impact ft-lb/in −28.8° C. | Tensile Modulus $\times 10^{-5}$ psi | Tensile Strength $\times 10^{-3}$ psi | Tensile Elongation at Yield % | UL-94 Rating 1/8" | UL-94 Rating 1/16" | HDT - 264 psi, °C. * | HDT - 264 psi, °C. ** |
|---|---|---|---|---|---|---|---|---|---|---|
| 19 | 100:0 | 20.9 | 2.36 | 2.92 | 4.78 | 3.16 | V-0 | V-0 | 68 | 68 |
| 20 | 80:20 | 21.5 | 1.02 | 2.62 | 4.56 | 3.41 | V-0 | V-0 | 75 | 70 |
| 21 | 60:40 | 18.9 | 0.67 | 2.49 | 4.38 | 3.25 | NC | NC | 80 | 72 |
| 22 | 40:60 | 16.1 | 0.65 | 2.39 | 4.35 | 3.30 | NC | NC | 83 | 74 |
| 23 | 20:80 | 11.1 | 0.52 | 2.46 | 4.54 | 3.21 | NC | NC | 88 | 77 |
| 24 | 0:100 | 6.0 | 0.39 | 2.45 | 4.77 | 3.36 | NC | NC | 90 | 81 |

*annealed for 24 hrs. at 70° C.
**annealed for 48 hrs. at 50° C.

EXAMPLES 25-47

The ASA polymers may be blended with other commercially known high impact PVC compositions such as Geon 85856 (B. F. Goodrich Co.) and Ethyl 7042 (Ethyl Corp.). Results of such blends are shown in Tables 9 through 13. The blends were prepared as described above and tested as shown in Table 1.

TABLE 9

| Ex. No. | Weight Ratio of Geon 85856 to ASA Polymer II | Notched Izod Impact Strength ft-lb/in | | Heat Distortion Temperature (264 psi) °C. | |
|---|---|---|---|---|---|
| | | 23.3° C. | −28.8° C. | * | ** |
| 25 | 100:0 | 17.9 | 0.7 | 71 | 77 |
| 26 | 80:20 | 15.3 | 0.7 | 74 | 84 |
| 27 | 60:40 | 6.51 | 0.65 | 78 | 88 |
| 28 | 40:60 | 3.7 | 0.7 | 82 | 90 |
| 29 | 20:80 | 3.1 | 0.53 | 86 | 94 |

*annealed 48 hours at 50° C.
**annealed 24 hours at 70° C.

TABLE 10

| Ex. No. | Weight Ratio of Ethyl 7042 to ASA Polymer II | Notched Izod Impact Strength ft-lb/in | | Heat Distortion Temperature (264 psi) °C. | |
|---|---|---|---|---|---|
| | | 23.3° C. | −28.8° C. | ** | * |
| 30 | 80:20 | 15.4 | 0.5 | 82.5 | 73.5 |
| 31 | 60:40 | 6.7 | 0.5 | 86.3 | 78.3 |
| 32 | 50:50 | 1.8 | 0.5 | 88.5 | 79.5 |
| 33 | 40:60 | 1.5 | 0.5 | 91 | 81.5 |
| 34 | 20:80 | 1.8 | 0.4 | 94 | 86.3 |

*annealed 48 hours at 50° C.
**annealed 24 hours at 70° C.

TABLE 11

| Ex. No. | Weight Ratio of Ethyl 7042 to ASA Polymer I | Notched Izod Impact Strength ft-lb/in | | Heat Distortion Temperature (264 psi) °C. | |
|---|---|---|---|---|---|
| | | 23.3° C. | −28.8° C. | * | ** |
| 35 | 80:20 | 14.9 | 0.6 | 71.3 | 79.3 |
| 36 | 60:40 | 12.1 | 0.6 | 73.5 | 81.5 |
| 37 | 40:60 | 2.5 | 0.5 | 76 | 84 |
| 38 | 20:80 | 2.6 | 0.4 | 78.8 | 86.3 |

*annealed 48 hours at 50° C.
**annealed 24 hours at 70° C.

TABLE 12

| Ex. No. | Weight Ratio of Geon 85856 to ASA Polymer I | Notched Izod Impact Strength ft-lb/in | | Heat Distortion Temperature (264 psi) °C. | |
|---|---|---|---|---|---|
| | | 23.3° C. | −28.8° C. | * | ** |
| 39 | 100:0 | 11.1 | 0.71 | 71 | 76 |
| 40 | 80:20 | 16.2 | 0.64 | 71 | 78 |
| 41 | 60:40 | 7.9 | 0.66 | 73 | 80 |
| 42 | 40:60 | 5.3 | 0.59 | 75 | 82 |
| 43 | 20:80 | 6.0 | 0.8 | 77 | 85 |

*annealed 48 hours at 50° C.
**annealed 24 hours at 70° C.

TABLE 13

| Ex. No. | Weight Ratio of Geon 85856 to ASA Polymer IV | Notched Izod Impact Strength ft-lb/in | | Heat Distortion Temperature (264 psi) °C. | |
|---|---|---|---|---|---|
| | | 23.3° C. | −28.8° C. | * | ** |
| 44 | 80:20 | 2.7 | 0.61 | 72 | 78 |
| 45 | 60:40 | 1.6 | 0.52 | 73 | 80 |
| 46 | 40:60 | 0.98 | 0.57 | 75 | 83 |
| 47 | 20:80 | 1.0 | 0.49 | 78 | 85 |

*annealed 48 hours at 50° C.
**annealed 24 hours at 70° C.

The foregoing examples illustrate that the blends of various ASA polymers with different high impact PVC formulations have excellent impact strengths. These blends also possess heat distortion temperatures considerably higher than the heat distortion temperature of the original high impact PVC formulation. It can be seen that the conditioning of these blends at 70° C. substantially increases their heat distortion temperatures further.

We claim:

1. A polymer composition comprising a high impact vinyl halide polymer which is a vinyl halide-hydrocarbon polyolefin graft copolymer; and a polymer of a vinyl aromatic compound, an unsaturated nitrile and a base polymer selected from the group consisting of chlorinated polyethylene and an acrylic polymer which comprises a polymer of (1) at least one alkyl acrylate, (2) at least one vinyl or vinylidene compound polymerizable with (1), and (3) a polyallyl compound.

2. The polymer composition of claim 1 wherein the high impact vinyl halide polymer is a vinyl halide-hydrocarbon polyolefin graft polymer comprising the product of bulk liquid phase polymerization of vinyl halide monomer alone or in combination with up to 50% by weight based on the total weight of monomer of another ethylenically unsaturated monomer copolymerizable therewith, in the presence of a free radical initiator compound for said polymerization, and about 0.05% to about 20% by weight, based upon said vinyl halide monomer, of a hydrocarbon olefin trunk polymer.

3. The polymer composition of claim 2 wherein the vinyl halide is vinyl chloride.

4. The polymer composition of claim 3 wherein the base polymer is chlorinated polyethylene.

5. The polymer composition of claim 3 wherein the base polymer is an acrylic polymer which comprises a polymer of (1) 60 to 99.9 percent by weight of at least one alkyl acrylate, (2) 0 to 20 percent by weight of at least one vinyl or vinylidene compound polymerizable with (1), and (3) 0.1 to 20 percent by weight of one organic polyallyl compound copolymerizable with component (1).

6. A polymer composition comprising a vinyl chloride polyolefin graft polymer wherein the polyolefin is present in a proportion of about 2 to about 20 weight percent based on the weight of vinyl chloride, and a polymer of styrene, acrylonitrile and chlorinated polyethylene.

7. The polymer composition of claim 6 wherein the polyolefin is present in a proportion of about 5 to about 18 weight percent based on the weight of vinyl chloride.

8. The polymer composition of claim 7 wherein the polyolefin is a terpolymer of ethylene, propylene and a diene monomer.

9. The polymer composition of claim 8 wherein the vinyl chloride polyolefin graft polymer is present in a proportion of about 40 to about 60 weight percent based on the weight of polymer components.

10. A polymer composition comprising a vinyl chloride polyolefin graft polymer wherein the polyolefin is present in a proportion of about 2 to about 20 weight percent based on the weight of vinyl chloride, and a graft polymer of 10 to 40 percent of a polymer of (1) 60 to 99.9 percent by weight of at least one alkyl acrylate, (2) 0 to 20 percent by weight of at least one vinyl compound polymerizable with component (1) and (3) 0.1 to 20 percent by weight of at least one organic polyallyl compound copolymerizable with component (1); and 90 to 60 percent by weight of a monomer mixture comprising 30 to 100 percent by weight of an aromatic vinyl monomer and 0 to 70 percent by weight of acrylonitrile and methyl methacrylate in which the proportion of acrylonitrile is 20 to 100 percent by weight with the remainder being methyl methacrylate.

11. The polymer composition of claim 10 wherein the polyolefin is present in a proportion of about 5 to about 18 weight percent based on the weight of vinyl chloride.

12. The polymer composition of claim 11 wherein the polyolefin is a terpolymer of ethylene, propylene and a diene monomer.

13. The polymer composition of claim 12 wherein the vinyl chloride polyolefin graft polymer is present in a proportion of about 40 to about 60 weight percent based on the weight of polymer components.

* * * * *